(12) United States Patent
Daraselia

(10) Patent No.: US 8,706,476 B2
(45) Date of Patent: Apr. 22, 2014

(54) NATURAL LANGUAGE PROCESSING METHOD BY ANALYZING PRIMITIVE SENTENCES, LOGICAL CLAUSES, CLAUSE TYPES AND VERBAL BLOCKS

(75) Inventor: Nikolai Daraselia, Germantown, MD (US)

(73) Assignee: Ariadne Genomics, Inc., Rockville, MD (US)

( * ) Notice: Subject to any disclaimer, the term of this patent is extended or adjusted under 35 U.S.C. 154(b) by 1541 days.

(21) Appl. No.: 11/898,952

(22) Filed: Sep. 18, 2007

(65) Prior Publication Data

US 2009/0076796 A1    Mar. 19, 2009

(51) Int. Cl.
*G06F 17/27* (2006.01)
*G06F 17/20* (2006.01)
*G06F 17/28* (2006.01)
*G06F 9/44* (2006.01)

(52) U.S. Cl.
CPC .......... *G06F 17/2785* (2013.01); *G06F 9/4448* (2013.01); *G06F 17/2872* (2013.01)
USPC ...................................... 704/9; 704/8; 704/4

(58) Field of Classification Search
USPC .............................................. 704/9; 364/419
See application file for complete search history.

(56) References Cited

U.S. PATENT DOCUMENTS

| | | | | |
|---|---|---|---|---|
| 4,773,009 A | * | 9/1988 | Kucera et al. | 715/260 |
| 4,864,502 A | * | 9/1989 | Kucera et al. | 704/8 |
| 4,868,750 A | * | 9/1989 | Kucera et al. | 704/8 |
| 2007/0022105 A1 | * | 1/2007 | Roux | 707/4 |

* cited by examiner

*Primary Examiner* — David R. Hudspeth
*Assistant Examiner* — Farzad Kazeminezhad
(74) *Attorney, Agent, or Firm* — Nixon Peabody LLP; Jeffrey L. Costellia

(57) ABSTRACT

Methods for converting a natural language sentence into a set of primitive sentences. The method includes identifying verbal blocks in the sentence, splitting the sentence into a set of logical clauses, determining a type of each clause wherein the type of each clause determines whether or not said clause contains verbal blocks, disambiguating ambiguous verbal blocks within each logical Clause, mad constructing a primitive sentence for each verbal block by duplicating the shared noun phrases of verbal blocks.

8 Claims, No Drawings

NATURAL LANGUAGE PROCESSING METHOD BY ANALYZING PRIMITIVE SENTENCES, LOGICAL CLAUSES, CLAUSE TYPES AND VERBAL BLOCKS

FIELD OF INVENTION

The present invention relates generally to the fields of natural language processing and information extraction. More particularly, the present invention provides systems and methods for converting complex natural language sentences into simple structures, so that information can be extracted efficiently using regular expression-like patterns.

BACKGROUND OF THE INVENTION

In our age of information explosion, thousands and thousands of journal articles, scientific papers, and other kinds of written documents are generated everyday. A particular person may be interested in certain information contained in at least some of these documents, but lack the capacity to read the documents and extract the information of interest.

Biological research regarding the living cell is one example of this problem. The living cell is a complex machine that depends on the proper functioning of its numerous parts, including proteins. Information about protein function and cellular pathways is central to the system-level understanding of a living organism. However, the collective knowledge about protein functions and pathways is scattered throughout numerous publications in scientific journals. Although a number of available databases cover different aspects of protein function, these databases depend on human experts to input data. As a result, these databases rarely store more than a few thousands of the best-known protein relationships and do not contain the most recently discovered facts and experimental details. While the number of new publications in this field grows rapidly, bringing the relevant information together becomes a bottleneck in the research and discovery process. There is, therefore, an urgent need for an automated system capable of accurately extracting information regarding protein function and cellular pathway from available literature. Moreover, such a system can find application in numerous fields other than biological research.

Conventional approaches aimed at solving this problem range from simple statistical methods to advanced natural language processing (NLP) techniques. For example, in the context of biological research, one simple way to extract protein function information is to detect the co-occurrence of protein names in a text. However, by its nature, the name co-occurrence detection yields very little or no information about the type of a described relation and, therefore, the co-occurrence data may be misleading.

Another information extraction approaches rely on the matching of pre-specified templates (i.e., patterns) or rules (e.g. precedence/following rules of specific words). The underlying assumption is that sentences conforming exactly to a pattern or a rule express the predefined relationships between the sentence entities. In some cases, these rules and patterns are augmented with additional restrictions based on syntactic categories and word forms in order to achieve better matching precision. One major shortcoming of this approach is that various syntactic constructs have to be explicitly encoded in the rules and that the number of such rules required for practical information extraction is large. In addition, relationships expressed as coordinated clauses or verbal phrase conjunctions in a sentence can not be captured.

Yet another approach utilizes shallow parsing techniques to process natural language sentences and extract information. Unlike word based pattern matchers, shallow parsers perform partial decomposition of a sentence structure. They identify certain phrasal components and extract local dependencies between them without reconstructing the structure of an entire sentence. Shallow parsers also rely on usage of regular expressions over the syntactic tags of the sentence lexemes to detect specific syntactic constructs (noun phrases or verb phrases). The downfall of shallow parsing is its inability to account for the global sentence context as well as the inability to capture long range syntactic dependencies. The precision and recall rates reported for shallow parsing approaches are 50-80% and 30-70%, respectively.

Another approach, based on full sentence parsing, is more promising. This is because this approach deals with the structure of an entire sentence, and, therefore, is potentially more accurate. One example of this approach is a semantic grammar-based system, which requires complete redesign of the grammar in order to be tuned to a different domain. Another example of this approach uses a modular architecture that separates NLP and information extraction into different modules. In this two-step information extraction system, the first step is the construction of the sentence argument structure using general-purpose domain independent parsers. The second step is domain-specific frame extraction.

Conventional full sentence NLP based information extraction approaches suffers from several problems. One problem is efficiency, relating to an intermediate step during the processing of a natural language sentence. This intermediate step involves the construction of a semantic tree of the sentence. A semantic tree is represented by a directed acyclic graph (DAG)—data structures consisting of sentence lexemes which are connected with labeled vertices. A label on a vertex indicates the logical relation between words. Syntactic variations can be reduced to a single semantic tree for efficient information extraction. (For example, the following sentences: "A inhibits B", "B is inhibited by A", "A was shown to inhibit B", "B inhibitor A", "inhibition of B by A", "A by which B is inhibited", and so on, are represented by a single semantic tree: inhibit{agentA, what=B}, where "inhibit", "A", and "B" are sentence lexemes, and "agent" and "what" are semantic labels of A and B in the parent lexeme "inhibit".) Because of the complexities and ambiguities of the natural language, numerous semantic trees with different structures may result from a single sentence, each of which has to be processed to extract information. This results in inefficiency. Classical NLP approaches also rely on grammar to construct semantic trees. It is necessary to create and maintain complete grammar of a language, which is a cumbersome task. Therefore, a method and a system that can process natural language sentences and extract information from the sentences accurately and efficiently is highly desirable. The present invention provides such a method and a system.

SUMMARY OF THE INVENTION

The present invention provides a method and a system that can process natural language sentences and extract information from the sentences accurately and efficiently. In one embodiment, the invention provides a method for converting a natural language sentence into a set of primitive sentences. This is achieved by first identifying verbal blocks in the sentence and splitting the sentence into a set of subordinate and/or coordinate logical clauses. In addition, ambiguous verbal blocks within each logical clause are disambiguated. Finally, a primitive sentence is constructed for each verbal block by duplicating the shared noun phrases of verbal blocks. In a specific embodiment, information is extracted from each of the resulting primitive sentences using simple regular expression-like word patterns.

DETAILED DESCRIPTION OF THE INVENTION

The present invention provides new approaches to parsing and deconstructing natural language sentences into smaller units for information extraction. In one embodiment, the invention provides a method for converting a natural language sentence into a set of primitive sentences. A primitive sentence is a sentence containing exactly one relation, expressed by a verbal block, between two or more noun phrases. For example, the sentence "We have shown that A, which inhibits B, activates and phosphorylates C" contains the following primitive sentences: "A inhibits B", "A activates C", and "A phosphorylates C." A more complex sentence: "In many cases, A, which was shown to inhibit B, also activates C, suggesting that A pbosphorylates E" contains the following primitive sentences: "A was shown to inhibit B", "A activates C", "A phoshorylates E". Primitive sentences are to the great extent syntactically normalized and can be directly used to accurately extract information by pattern-based approaches (approaches relying on detection of the specific sequences of words in the sentence).

Converting a natural language sentence to a set of smaller units, whether primitive sentences, consists of several steps. First, we identify verbal blocks in a sentence. A verbal block is a sequence of sentence lexemes which encodes a "relation" between subject and object entities expressed in an individual verb phrase. It can be a simple verb, e.g., "inhibit", or more complex verbal constructs, such as "can be inhibited", "was shown to activate", "is suggested to play a role", and so on. A verbal block can also contain adjectives, for example, "is critically important", and nouns, for example, "is target".

Verbal blocks can be identified using a finite state automaton operating on syntactic categories of sentence lexemes. Table 1 is a set of syntactic categories designed for this specific purpose.

TABLE 1

| Syntactic Categories | |
|---|---|
| Category | Description |
| ( | Left bracket |
| ) | Right bracket |
| A | Determiner "a" |
| AND | "and" |
| As | "as" |
| BE | Verb "be" |
| BUT | "but" |
| BUT_NOT | "but not" |
| By | Preposition "by" |
| CCD | adverb |
| CCJ | Sentence conjunctions |
| CCJN | Sentence conjunctions |
| Cdet | Other determiners ("some", "all") |
| COMMA | Comma |
| D | Adverb |
| DASH | "—" |
| DET | determiner |
| E | Past verb form |
| EITHER | "either" |
| Exemp | |
| IF | "if" |
| J | Adjective |
| N | Noun |
| Neg | "not" |

TABLE 1-continued

| Syntactic Categories | |
|---|---|
| Category | Description |
| NEITHER | "neither" |
| NOR | "nor" |
| Of | Preposition "of" |
| OR | "or" |
| prepN | prepositions |
| prepV | prepositions |
| Pron | Pronouns |
| PronPos | Possessive pronouns |
| STOP | period |
| THAN | "than" |
| THAT | "that" |
| To | "to" |
| V | Verb |
| Ving | Pres. Cont. verb |
| WHEN | "when" |
| WHERE | "where" |
| WHFORM | |
| WHICH | "which" |
| WHILE | "while" |

The automaton can be compiled from a set of regular expressions, designed to capture the great majority of all valid English verbal constructs. Verbal blocks can be definitive or ambiguous. The examples of verbal blocks are described in the examples set forth below.

The next task is to split the sentence into a set of subordinate or coordinate logical clauses. This task can be performed before the above mentioned task of identifying verbal blocks. There are several different types of logical clauses:

Main clauses represent the central idea expressed in a sentence. Each sentence may contain one or more (usually no more than two) coordinated central clauses separated by clause conjunctions. For example, sentence "A inhibits B, while C activates D" contains two main clauses separated by clause conjunction "while".

Which/that clauses represent the description of one of the relation entities. For example sentence "A, which inhibits B, activates D" contains main clause "A activates D" and which/that clause "which inhibits B", which describes entity A.

Apposition clauses serve the same descriptive purpose as a which/that clause, but are syntactically expressed in a different manner and do not contain verbal blocks. In the sentence "A, a B inhibitor, activates C", the phrase "a B inhibitor" is the apposition clause.

V-complement clauses represent statements which are under logical subordination of a main verb. For example, sentence "We have shown that A inhibits B" contains the main clause "we have shown" and a subordinate v-complement clause "A inhibits B". The logical interpretation of the subordinate v-complement clause is completely determined by the meaning of the main verb (compare "we have shown" and "we have failed to prove").

Prepositional modifier clauses provide additional descriptive information about the action or event expressed by the main clause. For example, in the sentence "Under these conditions, A activates B", the phrase "under these conditions" is the prepositional modifier. Notably, they can be easily detected only when they precede the main clause.

Adverbial modifier clauses serve the same purpose as prepositional modifier clauses but are expressed by simple adverbs or adverbial phrases. For example, in the sentence "A, on the other hand, does not activate B", the phrase "on the other hand" is the adverbial modifier.

Conditional clauses express conditional coordination between clauses. For example, in the sentence "A activates B if C inhibits D", the phrase "if C inhibits D" is the conditional clause. Structurally it is similar to the main clause.

To-clauses are subordinate clauses expressing the goal or methods of the action described in the main clause. For example, in the sentence "A activates B to inhibit C", the phrase "to inhibit C" is the to-clause.

As-clauses are coordinate clauses most frequently indicating the discovery method for the statement expressed in the main clause. For example, in the sentence "A activates B, as was shown by PCR analysis", the phrase "as was shown by the PCR analysis" is the as-clause.

By-clauses are subordinate clauses expressing methods of the action defined in the main clause. For example, in the sentence "A activates B by inhibiting D", the phrase "by inhibiting D" is the by-clause.

ING-clause are coordinate clauses usually expressing a statement independent from or loosely logically coupled with the statement in the main clause. For example, in the sentence "A activates B, suggesting D", the phrase "suggesting D" is the ING-clause.

The type of each clause dictates whether it can or can not contain verbal blocks. The splitting is done by using a set of regular expressions, to detect the borders of each clause, and also a set of simple rules to detect the right-end borders of some clauses.

The next step is the disambiguation of ambiguous verbal blocks within each particular clause. There are three major sources of syntactic ambiguities relevant to the detection of noun phrases and verbal blocks:

past tense of verb, which serves as a verb in past tense or as an adjective. For example, in the sentence "A inhibits activated B", the word "activated" is no longer a verb in past tense (category denoted "E").

present continuous verb form, which can serve as verb, noun or adjective (category denoted "G").

truly ambiguous noun/verb lexemes. For examples, "result", "account", etc (category denoted "Vambig").

To perform the disambiguation task, a combination of two different approaches can be used: the local approach and the global approach. Local disambiguation, which is well known in the art, is performed by examining the lexemes immediately preceding and following ambiguous one. In some embodiments, a rule-based local disambiguation is used. In a rule-based local disambiguation, the local context is described by a set of regular expression-like rules. Each rule has a left part which encodes an ambiguous category and its immediate syntactic neighborhood and a right part which defines what non-ambiguous category should be used instead of ambiguous one. When the rule is matched over a sentence, an ambiguous category within the rule is replaced with non-ambiguous one suggested by the rule.

Global disambiguation relies on the linguistic properties of the clauses, which dictate, that each clause can contain only one verbal block or a conjunction of verbal blocks. There are two types of verbal conjunctions within each clause—a verbal block conjunction, for example, "A inhibits and phosphorylates B", and verbal phrase conjunction, for example, "A inhibits B and activates D". Accordingly, the core structure of a verbal block containing clause can be expressed by the following regular expression:

NPV((,V)*and|but|orV)?NP((,VNP)*and|but|or V NP)?

where "V" designates verbal block, and "NP" is any non-verbal sequence of lexeme categories, "*" denotes sub-expression repeating 0 or more times, and "?" denotes parenthesized optional sub-expression. The global disambiguation algorithm looks for either type of conjunction and tries to detect at least one non-ambiguous verbal block/phrase. If such a verbal block/phrase is detected the whole conjunction is disambiguated.

After completion of the above tasks, the set of logical clauses is captured and zero or more verbal blocks are identified in each. The information is enough to generate a set of short primitive sentences from the original sentence.

The primitive sentences are constructed by duplicating the shared noun phrases for each of the verbal block conjunctions within each clause and for subordinate clauses. For example, the sentence "We have shown that A, which inhibits B, activates and phosphorylates C" is converted to the following primitive sentences: "A inhibits B", "A activates C", and "A phosphorylates C".

A prototype system incorporating the present invention has been developed to process MEDLINE sentences. In the output, each input sentence was partitioned into a linear sequence of individual logical clauses (each of its own type) and within each logical clause the verbal blocks were detected. The preliminary results show that the sentence is correctly split into clauses in ~95% of all cases. The verbal blocks in clauses are detected with ~95% accuracy.

The present invention has a number of advantages over previous approaches. The first advantage is simplicity. Classical NLP approaches requires the full grammar of the English language, which must encode all valid syntactic constructs and therefore can contain thousands of rules. The approach in this invention requires only a small set of regular expressions required for verbal block encoding and clause boundaries encoding, and a much simpler grammar to capture the semantic structure for each clause.

Another advantage is performance. Unlike the grammar-based parsers, which in general have an order of complexity $O(n^3)$, where n the number of sentence lexemes, the approach in this invention is linearly dependent on the sentence length, and is thousands of times faster than traditional parsers.

Although the invention is first conceived as a method to extract protein interaction and cellular pathway information from biological science journals, it can be utilized across different domains, including, but not limited to business news, commercial press releases, military messages, etc. The primitive sentences can be used for indexing large text corpora in such a manner to allow quick search for relations between phrases and individual words.

EXAMPLES

Existing implementation of the described sentence decomposition algorithm covers all major grammatical phenomena of the English language. Specifically, it can normalize: (1) verbal conjunction; (2) active/passive voice; (3) verbal phrase (VP) conjunctions; (4) noun phrase (NP) conjunctions; (5) NP modifiers; (6) VP modifiers; (7) some syntactic movements; and (8) NP prepositional structure.

The examples described here illustrate the broad grammatical coverage of sentence decomposition algorithm. Each example consists of original sentence followed by a set of derived primitive sentences. The set of sentences are designed to illustrate all major English grammatical phenomena. The identified verbal blocks are colored in red. Each primitive sentence starts with "#" followed by the type of clause. Only primitive sentences containing domain-specific named entities (proteins, small molecules, etc) are shown.

Mechanistically, we found that ID{1241555=oxalate} works exogenously by blocking generation of ID{1428929=reactive oxygen species} in susceptible plants and reducing ID{4000000,4003443=oxidative damage} generated in response to ID{1221537=catechin}.

VPmod ID{1241555=oxalate} & block susceptible plants ID{1428929=reactive oxygen species} generation

VPmod ID{1241555=oxalate} & reduce ID{4000000, 4003443=oxidative damage}

NPRel ID{1221537=catechin} response & generate ID{4000000,4003443=oxidative damage}

Using this approach it was shown that ID{1241583=SNP}, as well as ID{1000000=potassium ferricyanide (Fe(III)CN)} and ID{100000=potassium ferrocyanide (Fe(II)CN)}, reduced ID{4000000,4005177=dormancy} of *Arabidopsis* seeds by generating ID{1360624=cyanide} (ID{1360624=CN}).

Main ID{1000000=potassium ferrocyanide (Fe(II)CN)} & reduce *Arabidopsis* seeds ID{4000000, 4005177=dormancy}

Main ID{1100000=potassium ferricyanide (Fe(III)CN)} & reduce *Arabidopsis* seeds ID{4000000, 4005177=dormancy}

Main ID{1241583=SNP} & reduce *Arabidopsis* seeds ID{4000000,4005177=dormancy}

VPmod ID{1000000=potassium ferrocyanide (Fe(II) CN)} & generate ID{1360624=cyanide} ID{1360624= (CN)}

VPmod ID{10100000=potassium ferricyanide (Fe(III) CN)} & generate ID{1360624=cyanide} ID{1360624= (CN)}

VPmod ID{1241583=SNP} & generate ID{1360624=cyanide} ID{1360624=(CN)}

ID{1230243=Inosinate} formed from ID{1399378=hypoxanthine} was converted into ID{1371589=AMP} and ID{1354177=GMP}, which were then catabolized to ID{1415559=adenine} and ID{1220082=guanosine} respectively.

Main ID{1354177=GMP} & convert ID{1230243=Inosinate}

Main ID{1371589=AMP} & convert ID{1230243=Inosinate}

NPmod ID{1220082=guanosine} & catabolize ID{1354177=GMP}

NPmod ID{1415559=adenine} & catabolize ID{1354177=GMP}

NPmod ID{1220082=guanosine} & catabolize ID{1371589=AMP}

NPmod ID{1415559=adenine} & catabolize ID{1371589=AMP}

NPRel ID{1399378=hypoxanthine} & form ID{1230243=Inosinate}

Sequencing of the 3'RACE products indicated that ID{611385=SiP1}, ID{611387=SiP2} and ID{610693=HaP1} encoded ID{12104295=trypsin}-like ID{12003285=serine proteinases}, while ID{819738=HaP2} encoded a chymotrypsin-like ID{12003285=serine proteinases}.

Main ID{0,610693,611385,611387=SiP1, SiP2 and HaP1} & encode ID{12003285=serine proteinases}

Main ID{819738=HaP2} & encode chymotrypsin-like ID{12003285=serine proteinases}

Mechanistically, we found that ID{1241555=oxaiate} works exogenously by blocking generation of ID{1428929=reactive oxygen species} in susceptible plants and reducing ID{4000000,4003443=oxidative damage} generated in response to ID{1221537=catechin}.

VPmod ID{1241555=oxalate} & block susceptible plants ID{1428929=reactive oxygen species} generation

VPmod ID{1241555=oxalate} & reduce ID{4000000, 4003443=oxidative damage}

NPRel ID{1221537=catechin} response & generate ID{4000000,4003443=oxidative damage}

Here, we report an analysis of the diverse and specific ID{1000000=flavonoids} that accumulate during ID{4000000,4005647=seed development} and maturation in wild types and mutants.

NPmod diverse and specific ID{1000000=flavonoids} analysis & accumulate maturation.

NPmod diverse and specific ID{1000000=flavonoids} analysis & accumulate ID{4000000,4005647=seed development}

The RING domain of ID{836616=CIP8} is required and is sufficient for ID{12104842=ubiquitin ligase activity}.

Main ID{12104842=ubiquitin ligase activity} & require ID{836616=CIP8} RING domain.

Main ID{12104842=ubiquitin ligase activity} & sufficient ID{836616=CIP8} RING domain ID{817956=ettin (ett)} mutations have pleiotropic effects on *Arabidopsis* ID{4000000,4005228=flower development}, causing increases in perianth organ number, decreases in ID{4000000,4005025,4005713=stamen number and anther formation}, and apical-basal patterning defects in the gynoecium.

Main ID{817956=ettin (ett)} mutations & have *Arabidopsis* ID{4000000,4005228=flower development} pleiotropic effects

VPmod ID{817956=ettin (ett)} mutations & cause perianth organ number increases

VPmod ID{817956=ettin (ett)} mutations & cause ID{4000000,4005025,4005713=stamen number and anther formation} decreases

VPmod ID{817956=ettin (ett)} mutations & cause gynoecium apical-basal patterning defects ID{612917=AHP6}, an inhibitory pseudophosphotransfer protein, counteracts ID{1000000=cytokinin} signaling, allowing ID{400,0000,4005608=protoxylem formation}.

Main ID{612917-AHP6} & counteract ID{1000000=cytokinin} signaling

VPmod ID{612917=AHP6} & allow ID{4000000, 4005608=protoxylem formation}

Mechanistically, we found that ID{1241555=oxalate} works exogenously by blocking generation of ID{1428929=reactive oxygen species} in susceptible plants and reducing ID{4000000,4003443=oxidative damage} generated in response to ID{11221537=catechin}.

VPmod ID{1241555=oxalate} & block susceptible plants ID{1428929=reactive oxygen species} generation

VPmod ID{1241555=oxalate} & reduce ID{4000000, 4003443=oxidative damage}

The ID{609348=MAT} region of *Ustilago hordei*, a bipolar barley pathogen, harbors distinct ID{4000000, 4003717=mating} functions (a and b loci).

Main *Ustilago hordei* ID{609348=MAT} region & harbor distinct ID{4000000,4003717=mating} functions (a and b loci)

The increase in ID{610266=DHAR} expression increased foliar and kernel ID{1336119=ascorbic acid} levels 2- to 4-fold and significantly increased the ID{1297509=ascorbate} redox state in both tobacco and maize.

Main ID{610266=DHAR} expression increase & increase kernel ID{1336119=ascorbic acid} levels 2- to 4-fold

Main ID{610266=DHAR} expression increase & increase both tobacco ID{1297509=ascorbate} redox state ID{1214008=Furan} induced ID{1408700=trifluorothymidine} resistance in mouse L5178Y lymphoma cells in the absence of S9, and ID{2000000,2000789=sister chromatid} exchanges and ID{2000000,2000802=chromosomal} aberrations in ID{11013387=Chinese hamster ovary cells}, with and without S9.

Main ID{1214008=Furan} & induce S 9 absence mouse L 5178 Y lymphoma cells ID{1408700=trifluorothymidine} resistance

Main ID{1214008=Furan} & induce ID{2000000, 2000789=sister chromatid} exchanges

Main ID{1214008=Furan} & induce ID{11013387=Chinese hamster ovary cells} ID{2000000, 2000802=chromosomal} aberrations This factor (ID{611069=GBF}) is distinct from the factor ID{612311=GT-1} which binds to adjacent GT boxes in the pea ID{611557=rbcS-3A} promoter.

Main This factor ID{611069=(GBF)} & distinct factor ID{612311=GT-1}

NPmod factor ID{612311=GT-1} & bind pea ID{611557=rbcS-3A} promoter adjacent GT boxes Site-directed ID{4000000,4106280=mutagenesis} of the ID{617923=PpLEA-1} promoter indicates that ID{1241341=ABA}-inducibility is mediated via an ID{612819=ACGT}-core motif similar to that seen in the ID{4000000,4005004=ABA response} elements of higher plant ID{1299198=LEA} genes.

Main ID{612819=ACGT}-core motif & mediate ID{1241341=ABA}-inducibility

NPmod ID{612819=ACGT}-core motif & seen higher plant ID{1299198=LEA} genes ID{4000000, 4005004=ABA response} elements ID{827230=CLA} significantlyreducedantigen-induced ID{1338404=histamine} and ID{1421143=PGE} (2) release.

Main ID{827230=CLA} & reduce ID{1421143=PGE} (2) release

Main ID{827230=CLA} & reduce ID{1338404=histamine}

Together, these data suggest that the 120- and 160-kDa proteins are ID{608111=PSK-alpha} receptors that mediate the biological activities of ID{608111=PSK-alpha}.

NPmod ID{608111=PSK-alpha} receptors & mediate ID{608111=PSK-alpha} biological activities

I claim:

1. A method for converting a natural language sentence into a set of primitive sentences, comprising steps:
    (a) identifying verbal blocks in the sentence;
    (b) splitting the sentence into a set of logical clauses;
    (c) determining a type of each clause;
    (d) disambiguating ambiguous verbal blocks within each logical clause in which verbal blocks are considered independently of noun phrases; and
    (e) constructing a primitive sentence for each verbal block by duplicating the shared noun phrases of verbal blocks; and
    wherein the method is performed by a computer system comprising a processor and a non-transitory program storage device readable by the computer system,
    wherein the order of step (a) and step (b) is interchangeable,
    wherein the primitive sentence is a sentence containing one relation, expressed by a verbal block, between two or more noun phrases, and
    wherein the type of each clause determines whether or not said clause contains verbal blocks.

2. A method for extracting information from a natural language sentence, comprising:
    converting the sentence into a set of primitive sentences by detecting logical clauses;
    determining a type of each clause; and
    indexing corpora using at least one primitive sentence,
    wherein the method is performed by a computer system comprising a processor and a non-transitory program storage device readable by the computer system,
    wherein each primitive sentence is a sentence containing one relation, expressed by a verbal block, between two or more noun phrases, and
    wherein the type of each clause determines whether or not said clause contains verbal blocks.

3. A method for extracting information from a natural language sentence, comprising steps:
    (a) identifying verbal blocks in the sentence;
    (b) splitting the sentence into a set of logical clauses;
    (c) determining a type of each clause;
    (d) disambiguating ambiguous verbal blocks within each logical clause in which verbal blocks are considered independently of noun phrases;
    (e) constructing a primitive sentence for each verbal block by duplicating the shared noun phrases of verbal blocks; and
    (f) extracting information from each primitive sentence;
    wherein the method is performed by a computer system comprising a processor and a non-transitory program storage device readable by the computer system,
    wherein the order of step (a) and step (b) is interchangeable,
    wherein the primitive sentence is a sentence containing one relation, expressed by a verbal block, between two or more noun phrases, and
    wherein the type of each clause determines whether or not said clause contains verbal blocks.

4. The method of claim 3, wherein information is extracted from each primitive sentence by detecting sequences of words in the primitive sentence using regular expression-like word patterns.

5. A computer system comprising:
    a processor; and
    a non-transitory program storage device readable by the computer system, embodying a program of instructions executable by the processor to perform method steps for converting a natural language sentence into a set of primitive sentences, comprising:
    (a) identifying verbal blocks in the sentence;
    (b) splitting the sentence into a set of logical clauses;
    (c) determining a type of each clause;
    (d) disambiguating ambiguous verbal blocks within each logical clause in which verbal blocks are considered independently of noun phrases; and
    (e) constructing a primitive sentence for each verbal block by duplicating the shared noun phrases of verbal blocks;
    wherein the order of step (a) and step (b) is interchangeable,
    wherein the primitive sentence is a sentence containing one relation, expressed by a verbal block, between two or more noun phrases, and
    wherein the type of each clause determines whether or not said clause contains verbal blocks.

6. A computer system comprising:

a processor; and a non-transitory program storage device readable by the computer system, embodying a program of instructions executable by the processor to perform method steps for extracting information from a natural language sentence, comprising:

converting the sentence into a set of primitive sentences by detecting logical clauses;

determining a type of each clause; and indexing corpora using at least one primitive sentence, wherein each primitive sentence is a sentence containing one relation, expressed by a verbal block, between two or more noun phrases, and wherein the type of each clause determines whether or not said clause contains verbal blocks.

7. A computer system comprising:

a processor; and a non-transitory program storage device readable by the computer system, embodying a program of instructions executable by the processor to perform method steps for extracting information from a natural language sentence, comprising:

(a) identifying verbal blocks in the sentence;

(b) splitting the sentence into a set of logical clauses;

(c) determining a type of each clause;

(d) disambiguating ambiguous verbal blocks within each logical clause in which verbal blocks are considered independently of noun phrases;

(e) constructing a primitive sentence for each verbal block by duplicating the shared noun phrases of verbal blocks; and (f) extracting information from each primitive sentence;

wherein the order of step (a) and step (b) is interchangeable, wherein the primitive sentence is a sentence containing one relation, expressed by a verbal block, between two or more noun phrases, and wherein the type of each clause determines whether or not said clause contains verbal blocks.

8. A computer system of claim 7, wherein information is extracted from each primitive sentence by detecting specific sequences of words in the primitive sentence using regular expression-like word patterns.

* * * * *